United States Patent
Wu et al.

(10) Patent No.: US 9,203,578 B2
(45) Date of Patent: *Dec. 1, 2015

(54) ADAPTIVE SCHEDULING OF VOICE TRAFFIC IN A MULTI-CARRIER COMMUNICATION ENVIRONMENT

(75) Inventors: Jianming Wu, Nepean (CA); Wen Tong, Ottawa (CA); Peiying Zhu, Kanata (CA)

(73) Assignee: Apple Inc., Cupertino, CA (US)

( * ) Notice: Subject to any disclaimer, the term of this patent is extended or adjusted under 35 U.S.C. 154(b) by 372 days.

This patent is subject to a terminal disclaimer.

(21) Appl. No.: 13/446,461

(22) Filed: Apr. 13, 2012

(65) Prior Publication Data

US 2012/0195280 A1    Aug. 2, 2012

Related U.S. Application Data

(63) Continuation of application No. 10/599,103, filed as application No. PCT/IB2005/000772 on Mar. 24, 2005, now Pat. No. 8,165,009.

(60) Provisional application No. 60/558,329, filed on Mar. 31, 2004.

(51) Int. Cl.
*H04L 12/28* (2006.01)
*H04L 5/00* (2006.01)
(Continued)

(52) U.S. Cl.
CPC ............ *H04L 5/0037* (2013.01); *H04L 1/0009* (2013.01); *H04L 1/08* (2013.01);
(Continued)

(58) Field of Classification Search
CPC .................................................. H04W 72/12
USPC .......... 370/203–209, 252, 253, 328–338, 468
See application file for complete search history.

(56) References Cited

U.S. PATENT DOCUMENTS 6,246,713 B1 * 6/2001 Mattisson ...................... 375/132
6,493,331 B1 12/2002 Walton et al.
(Continued)

FOREIGN PATENT DOCUMENTS

CA    2 404 055 A1    3/2001
CA    2404055 A1 *   3/2001    ............. H04B 7/005
(Continued)

OTHER PUBLICATIONS

Koutsopoulos, I. et al., "Carrier Assignment Algorithms in Wireless Broadband Networks With Channel Adaptation," IEEE International Conference on Communications, ICC 2001, vol. 5, pp. 1401-1405, Helsinki, Finland.

(Continued)

*Primary Examiner* — Iqbal Zaidi
(74) *Attorney, Agent, or Firm* — Meyertons, Hood, Kivlin, Kowert & Goetzel, P.C.

(57) ABSTRACT

The present invention provides a technique for scheduling data, and in particular, scheduling real-time or voice data for transmissions during a transmit time interval in a multi-carrier communication environment. For each transmit time interval, channel condition indicia for multiple users is determined, and an iterative scheduling process is then implemented based in part on the channel condition indicia. The iterative scheduling initially pre-assigns select tones for each of the remaining users that have not been permanently assigned tones for the given transmit time interval. Next, the remaining user having the least favorable channel conditions is selected as an active user. The newly selected active user is then permanently assigned the select tones that were initially pre-assigned to that particular user. The permanently assigned tones are removed from consideration, and the process is repeated until all the remaining users are permanently assigned unique tones for scheduling.

14 Claims, 14 Drawing Sheets

(51) Int. Cl.
*H04L 1/00* (2006.01)
*H04L 1/08* (2006.01)
*H04L 1/18* (2006.01)
*H04W 72/12* (2009.01)
*H04W 28/26* (2009.01)
*H04W 72/08* (2009.01)

(52) U.S. Cl.
CPC ........... *H04L 1/1867* (2013.01); *H04L 5/0007* (2013.01); *H04W 72/12* (2013.01); *H04L 5/006* (2013.01); *H04L 5/0064* (2013.01); *H04W 28/26* (2013.01); *H04W 72/085* (2013.01); *H04W 72/1263* (2013.01)

(56) References Cited

U.S. PATENT DOCUMENTS

| | | | |
|---|---|---|---|
| 6,608,835 | B2 | 8/2003 | Geile et al. |
| 7,047,009 | B2 | 5/2006 | Laroia et al. |
| 2002/0122383 | A1 | 9/2002 | Wu et al. |
| 2003/0021245 | A1 | 1/2003 | Haumonte et al. |
| 2005/0096061 | A1* | 5/2005 | Ji et al. ............... 455/450 |
| 2005/0111462 | A1 | 5/2005 | Walton et al. |
| 2008/0181170 | A1 | 7/2008 | Branlund et al. |

FOREIGN PATENT DOCUMENTS

| | | | |
|---|---|---|---|
| CA | 2404055 | * | 9/2002 |
| CA | 2404055 | A1 | 9/2002 |
| WO | 01/76098 | | 10/2001 |
| WO | 2004/084571 | | 9/2004 |

OTHER PUBLICATIONS

Pietrzyk, S. et al., "Multiuser Subcarrier Allocation for QoS Provision in OFDMA Systems," IEEE Proceedings of the International Conference on Vehicular Technology, VTC, Sep. 2002, pp. 1077-1081, Vancouver, Canada.

Pfletschinger, S. et al., "Efficient Subcarrier Allocation for Multiple Access in OFDM Systems," 7th International OFDM-Workshop, Sep. 2002, pp. 21-25, Hamburg, Germany.

International Search Report for PCT/IB2005/000772, mailed Jul. 13, 2005.

Office Action in EP Application No. 05 718 268.5-2415, issued Dec. 18, 2012, pp. 1-6.

Wong et al.; "A real-time sub-carrier allocation scheme for multiple access downlink OFDM transmission;" Vehicular Technology Conference, VTC Fall 1999, IEEE VTS 50th, Amsterdam, Netherlands, Sep. 19-22, 1999, vol. 2, XP010353078, ISBN: 978-0/7803-5435-7; pp. 1124-1128.

* cited by examiner

OFDM TONES (FREQUENCY DOMAIN)

|   | 1 | 2 | 3 | 4 | 5 | 6 | 7 | 8 |
|---|---|---|---|---|---|---|---|---|
| 1 | X | X | X |   |   | X |   |   |
| 2 | X | X | X |   |   | X |   |   |
| 3 |   | X | X |   |   | X |   |   |
| 4 |   | X | X |   |   | X |   |   |
| 5 |   | X | X |   |   |   |   |   |
| 6 |   | X | X |   |   |   |   |   |

TIME BLOCKS (TIME DOMAIN)

ASSIGNED TONES

FIG. 11

SMALLEST UNIT CHANNEL
CH UNIT-1 (64 CHS)

SMALL UNIT CHANNEL
CH UNIT-2 (32 CHS)

LARGE UNIT CHANNEL
CH UNIT-1 (16 CHS)

LARGEST UNIT CHANNEL
CH UNIT-1 (8 CHS)

ADAPTIVE SCHEDULING OF VOICE TRAFFIC IN A MULTI-CARRIER COMMUNICATION ENVIRONMENT

This application is a Continuation of U.S. patent application Ser. No. 10/599,103, entitled ADAPTIVE SCHEDULING OF VOICE TRAFFIC IN A MULTI-CARRIER COMMUNICATION ENVIRONMENT, filed Sep. 19, 2006, now U.S. Pat. No. 8,165,009, which is a 371 application of international application PCT/IB05/100772, entitled ADAPTIVE SCHEDULING OF VOICE TRAFFIC IN A MULTI-CARRIER COMMUNICATION ENVIRONMENT, filed Mar. 24, 2005, which claims the benefit of U.S. provisional application Ser. No. 60/558,329, entitled OFDM BASED VOICE SERVICE BASED ON ADAPTIVE CHANNEL-AWARE SCHEDULING, filed Mar. 31, 2004, the disclosures of which are hereby incorporated by reference in their entireties.

FIELD OF THE INVENTION

The present invention relates to wireless communications, and in particular to scheduling voice traffic in a multi-carrier communication environment.

BACKGROUND OF THE INVENTION

In orthogonal frequency division multiplexing (OFDM), the transmission band is divided into multiple orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation requires the performance of an Inverse Fast Fourier Transform (IFFT) on the information to be transmitted. A Fast Fourier Transform (FFT) is used for demodulation. In practice, the IFFT and FFT are provided by digital signal processing carrying out an Inverse Discrete Fourier Transform (IDFT) and a Discrete Fourier Transform (DFT), respectively. As such, the characterizing feature of OFDM modulation is that orthogonal carrier waves are generated for multiple bands in a simultaneous fashion within a transmission channel.

One of the primary benefits of using OFDM modulation for communications is to enhance the robustness of the system against selective frequency fading and narrow band interference. Unlike single carrier systems, fading in a certain frequency range or interference in a certain frequency range will not cause the entire communication link to fail. In an OFDM system, only a small percentage of the parallel carriers will be affected by fading or interference at a given frequency.

Recently, the IEEE has adopted OFDM for certain 802.11 and 802.16 communication standards. These standards provide solutions for high data rate transmission in broadband systems. Although data is the current focus in these systems, voice services will need support in future systems. Unfortunately, OFDM presents certain obstacles for voice services. In particular, OFDM systems have large numbers of carriers that must be assigned and allocated for different services and users. As channel conditions vary, carrier allocation must vary to ensure efficient use of resources, while maintaining a desired quality of service.

Accordingly, there is a need to control allocation and assignment of OFDM carriers to accommodate voice traffic, while optimizing system resources and maintaining a desired quality of service. In particular, there is a need to ensure desired transmission rates while minimizing the number of carriers allocated to a given user.

SUMMARY OF THE INVENTION

The present invention provides a technique for scheduling data, and in particular, scheduling real-time or voice data for transmissions during a transmit time interval in a multi-carrier communication environment, such as an OFDM communication environment. For each transmit time interval, channel condition indicia for multiple users is determined, and an iterative scheduling process is then implemented based in part on the channel condition indicia. The iterative scheduling initially pre-assigns select OFDM tones for each of the remaining users that have not been permanently assigned tones for the given transmit time interval. Next, the remaining user having the least favorable channel conditions is selected as an active user. The newly selected active user is then permanently assigned the select OFDM tones that were initially pre-assigned to that particular user. The permanently assigned OFDM tones are removed from consideration, and the process is repeated until all the remaining users are permanently assigned unique OFDM tones. At this point, scheduling may be initiated.

The OFDM tones assigned to each user may be assigned in groups corresponding to channels. These channels define available tones throughout the transmit time interval. The transmit time interval is broken into time segments, referred to as blocks, wherein all of the available sub-carriers in the available OFDM spectrum are repeated for each block. Each sub-carrier in the resulting time-frequency continuum is referred to as a tone. If the tones are grouped into channels, channels may include tones over any number of frequencies or blocks.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 11 illustrates the tones scheduled for users 1-3 according to the scheduling of FIG. 10.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The following description begins with an overview of a wireless communication environment and the architecture of a base station, which includes any type of wireless or like access point for local wireless or cellular communications, and a mobile terminal. After the overview of the wireless communication environment, a detailed review of the scheduling techniques proposed by the current invention is provided, followed by a detailed review of exemplary transmit and receive architectures for facilitating orthogonal frequency division multiplexing (OFDM)-based communications.

Figure 1:
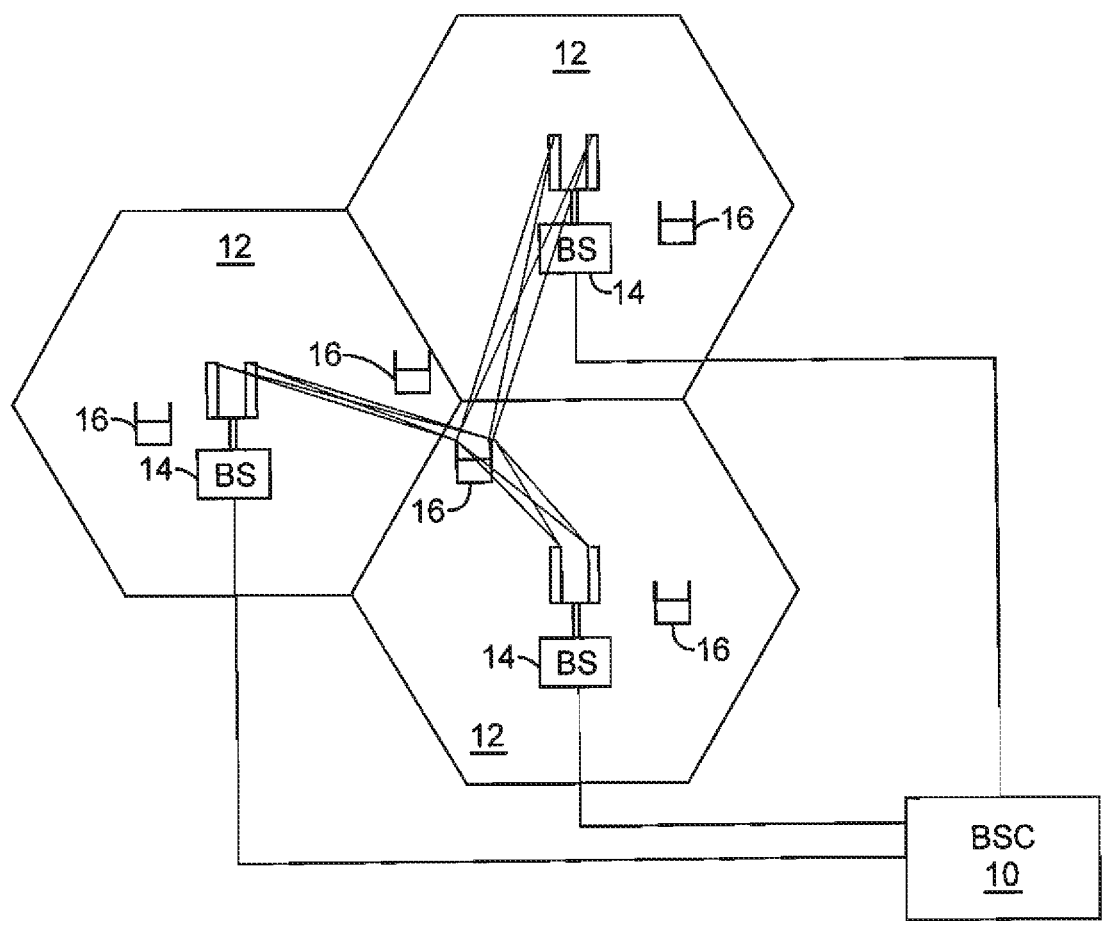
FIG. 1 is a block representation of a wireless communication system.

With reference to FIG. 1, a base station controller (BSC) 10 controls wireless communications within multiple cells 12, which are served by corresponding base stations (BS) 14. In general, each base station 14 facilitates communications using multi-carrier communications, such as OFDM, with mobile terminals 16, which are within the cell 12 associated with the corresponding base station 14. The movement of the mobile terminals 16 in relation to the base stations 14 results in significant fluctuation in channel conditions. As illustrated, the base stations 14 and mobile terminals 16 may include multiple antennas to provide spatial diversity for communications.

Figure 2:
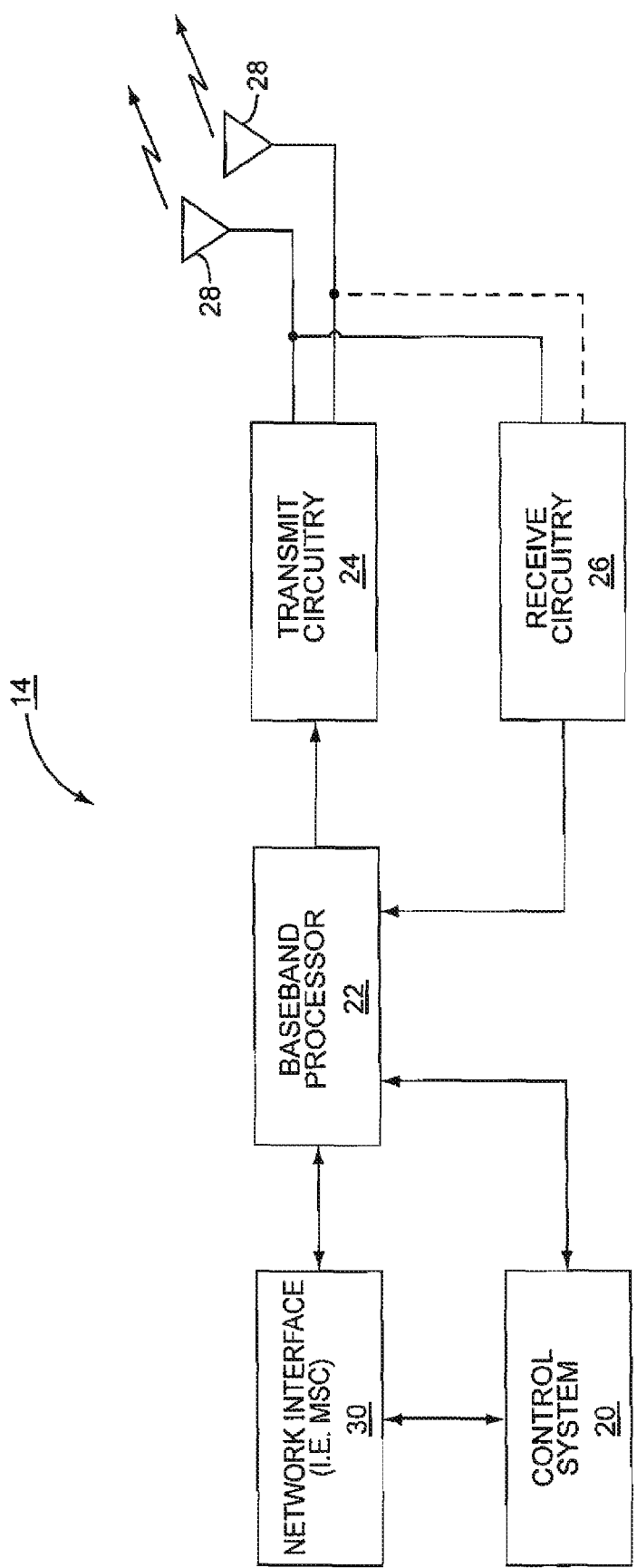
FIG. 2 is a block representation of a base station according to one embodiment of the present invention.

A high level overview of the mobile terminals 16 and base stations 14 of the present invention is provided prior to delving into the structural and functional details of the preferred embodiments. With reference to FIG. 2, a base station 14 configured according to one embodiment of the present invention is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by mobile terminals 16 (illustrated in FIG. 3). Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by the base station 14.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by a carrier signal having a desired transmit frequency or frequencies. A power amplifier (not shown) will amplify the modulated carrier signal to a level appropriate for transmission, and deliver the modulated carrier signal to the antennas 28 through a matching network (not shown). Modulation and processing details are described in greater detail below.

Figure 3:
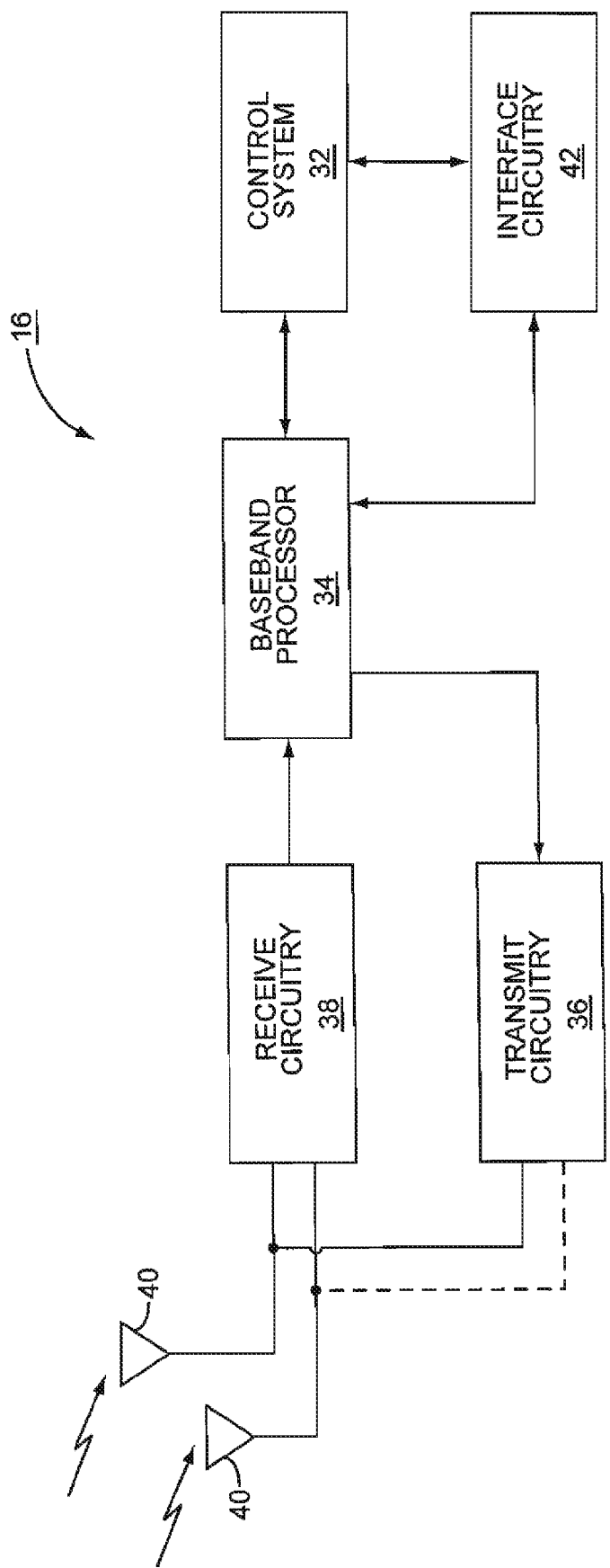
FIG. 3 is a block representation of a mobile terminal according to one embodiment of the present invention.

With reference to FIG. 3, a mobile terminal 16 configured according to one embodiment of the present invention is illustrated. Similarly to the base station 14, the mobile terminal 16 will include a control system 32, a baseband processor 34, transmit circuitry 36, receive circuitry 38, multiple antennas 40, and user interface circuitry 42. The receive circuitry 38 receives radio frequency signals bearing information from one or more base stations 14. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations, as will be discussed on greater detail below. The baseband processor 34 is generally implemented in one or more digital signal processors (DSPs) and application specific integrated circuits (ASICs).

For transmission, the baseband processor 34 receives digitized data, which may represent voice, data, or control information from the control system 32, which it encodes for transmission. The encoded data is output to the transmit circuitry 36, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 40 through a matching network (not shown). Further detail of OHM transmission and reception architectures are provided at the end of the specification, although those skilled in the art will appreciate that the techniques disclosed herein are applicable to any multi-carrier communication environment.

As noted, OFDM modulation divides the transmission band into multiple orthogonal carrier waves, which are transmitted in parallel. Using an IFFT process, each carrier wave is modulated according to the digital data to be transmitted on that particular carrier wave. Since the multiple carriers are transmitted in parallel, the transmission rate for the digital data, or symbols, on any given carrier is lower than when a single carrier is used.

Figure 4:
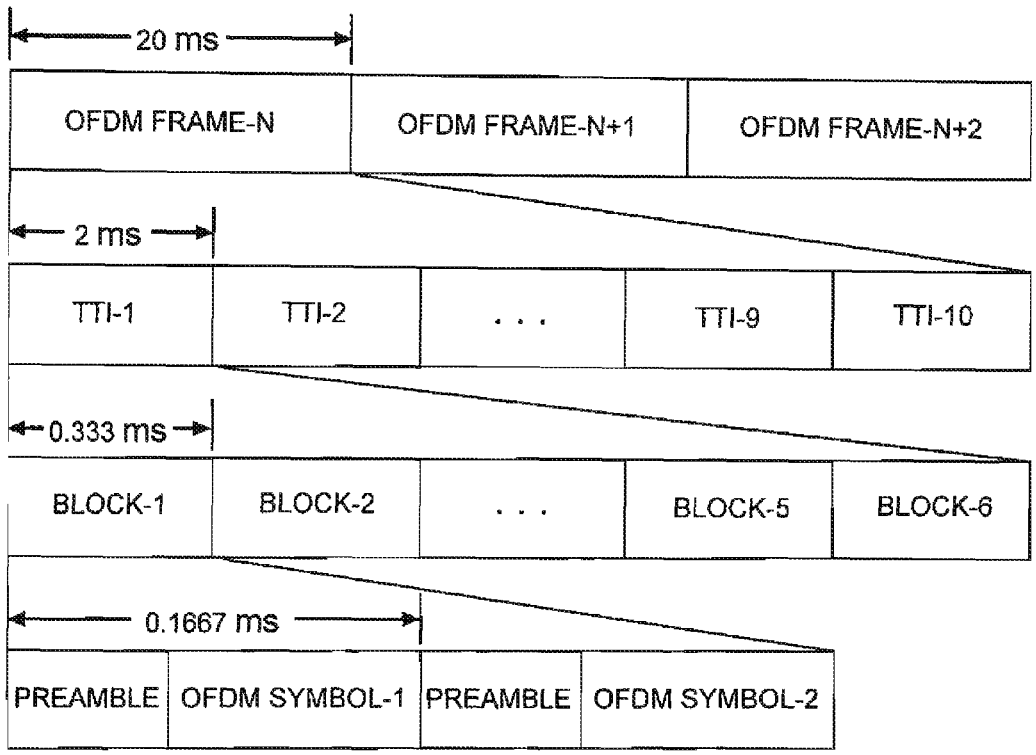
FIG. 4 illustrates an exemplary OFDM frame structure.

In OFDM communications, packets arriving at a base station 14 for forwarding over a forward link to the mobile terminal 16 are transmitted in OFDM frames. FIG. 4 illustrates an exemplary frame structure for OFDM communications. In the illustrated frame structure, each OFDM frame has a duration of 20 ms, and consists of ten transmit time intervals (TTIs) having a 2 ms duration. The voice packets may be assigned to any one or more TTIs, depending on channel conditions. The voice packet may be placed entirely into one TTI or broken into multiple sub-packets and delivered in multiple TTIs. Each TTI is formed by six blocks, each of which has two OFDM symbols. The transmission blocks have a 0.333 ms duration, while the OFDM symbols within a given block have a 0.1667 ms duration. The OFDM symbol will generally include a preamble portion and a data portion.

Figure 5:
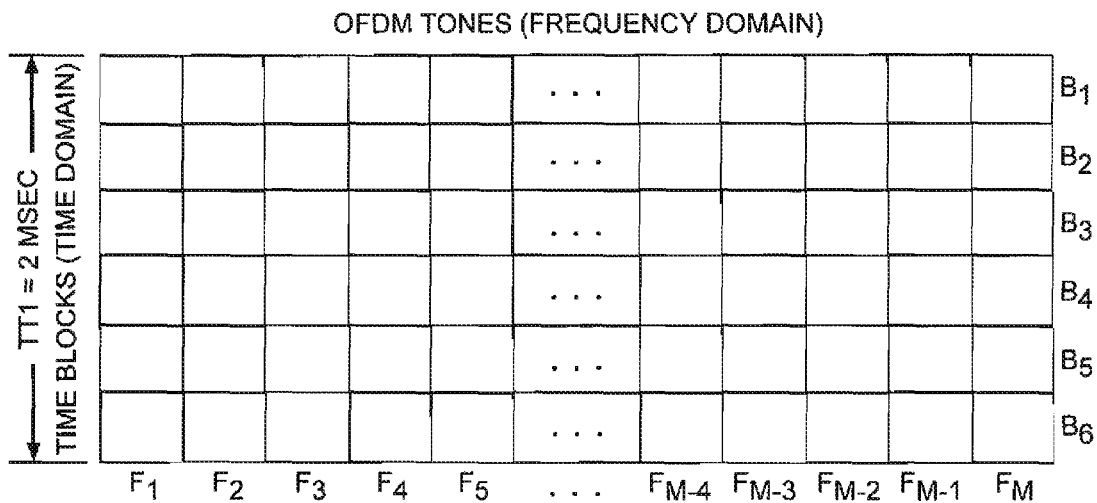
FIG. 5 illustrates the two-dimensional channels associated with an OFDM system over one transmit time interval.

As noted, OFDM provides a two-dimensional transmission system wherein at any given time multiple sub-carriers, hereafter referred to as "tones," are used to carry relatively lower rate data in parallel. FIG. 5 illustrates this two-dimensional architecture over one TTI. There are six blocks ($B_1$-$B_6$) throughout the TTI in the time domain, and there are $F_M$ OFDM tones in the frequency domain. Accordingly, there are $F_M$ tones that can be used for transmission during each time block. Within this architecture, packets to be transmitted to the mobile terminal 16 during a given TTI may be transmitted using any number of the tones in one or more of the blocks. As such, the base station 14 must assign various tones over the various time blocks in each transmit time interval to one or more mobile terminals 16 to facilitate scheduling. The present invention provides an efficient and effective system for providing scheduling when at least some of the packets are carrying voice or other real-time data.

Figure 6:
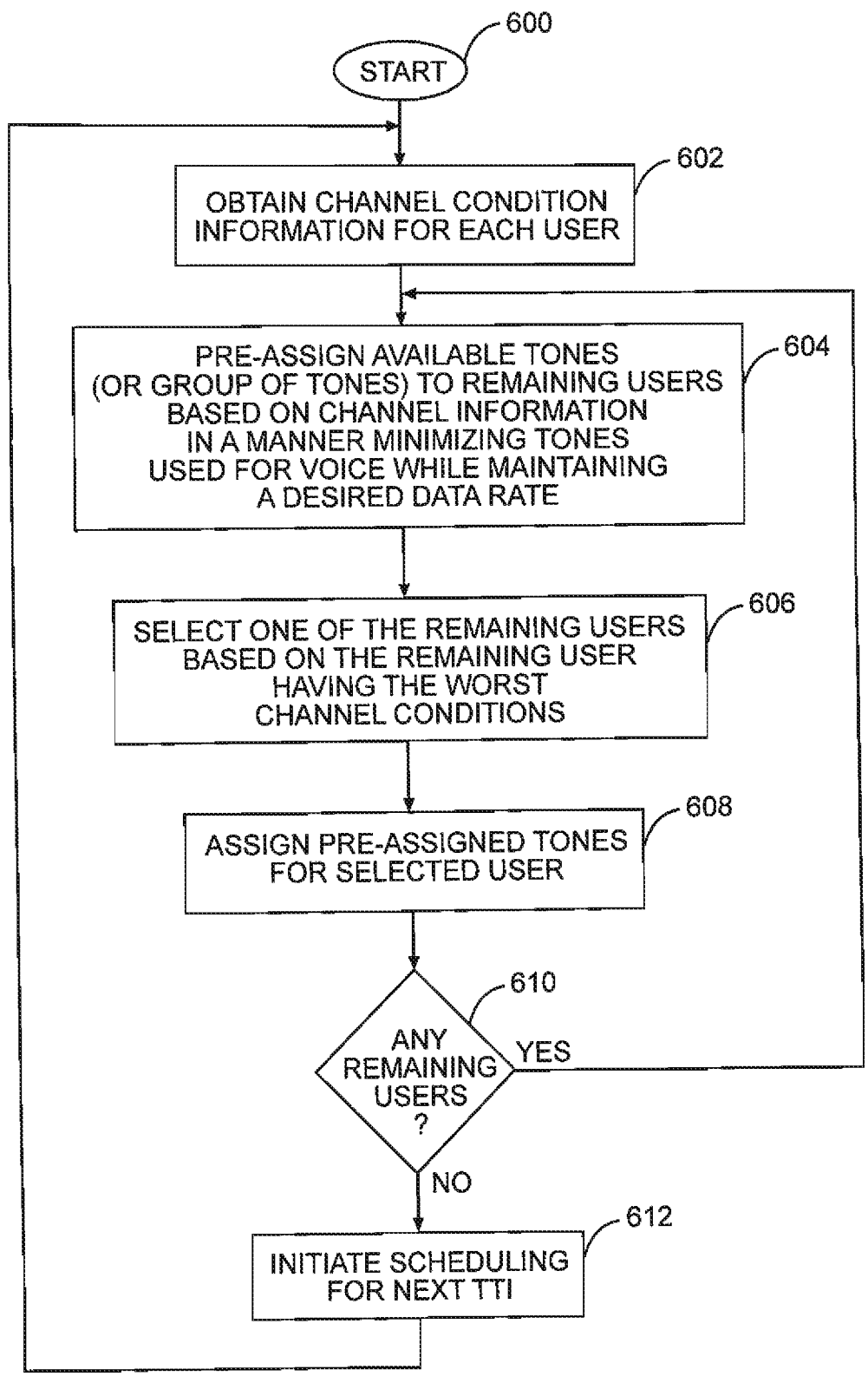
FIG. 6 is a flow diagram illustrating the overall operation of the present invention according to one embodiment.

With reference to FIG. 6, a flow diagram provides an overview of the basic operation of the present invention according to one embodiment. The process of scheduling tones for various users over a given TTI starts (step 600) by obtaining channel condition information for each user (step 602). The channel condition information is indicative of the channel conditions for each tone in the OFDM channel for each user. Although actual measurements for each tone may not be taken, the channel condition information allows for estimates to be made for all the tones, select tones, or groups of tones, sufficient to allow for assigning tones to the respective users based on relative channel conditions.

Once channel information is determined for the upcoming TTI, available tones are pre-assigned to the active users based on the channel information (step 604). In general, the active users are pre-assigned the tones associated with the best channel conditions. In particular, the tones are pre-assigned in a manner wherein the number of tones assigned to each user is minimized while maintaining a sufficient number of tones to ensure a desired data rate.

Next, the active user having the worst channel conditions is selected (step 606) and the pre-assigned tones are then permanently assigned to the selected user (step 608). The permanently assigned tones may be the same or different tones, and may be distributed throughout the time blocks within the given TTI. Assuming there are remaining tones that have not been permanently assigned, the process repeats if there are any remaining users (step 610). Since this was the first time through, there are likely additional users, and therefore, these remaining users need to be assigned tones for transmission within the TTI. The available tones that have not been permanently assigned to other users are again pre-assigned to the remaining users based on the channel information (step 604). The remaining user having the worst channel conditions is selected (step 606), and the pre-assigned tones are permanently assigned to the selected user (step 608). The process will repeat for the TTI until all of the active users have been permanently assigned tones for transmission. Once all users have been assigned tones, scheduling for the next TTI is initiated (step 612), wherein channel condition information for each of the active users in the new TTI will be obtained (step 602) prior to assigning tones to the active users as described above.

As is evident from the above, obtaining channel condition information for each user is necessary for scheduling. In one embodiment, the carrier-to-interference ratio (CIR) for each tone is either measured or estimated based on channel condition information reported by the users, or in particular, by the mobile terminals 16. The CIR for each user may be calculated by averaging the instant CIRs over each of the blocks in a corresponding TTI. This results in a reasonable CIR reporting interval corresponding to a TTI. Given the inherent delays in providing feedback for channel conditions, there is a certain delay in CIR reporting that must be taken into account. In practice, the average CIR over the six blocks in the TTI for select tones may be reported, and the CIR for each tone may be calculated by using linear interpolation. Further, groups of tones over one or more blocks may be associated with a single CIR to reduce signaling overhead. Such details are provided further below.

Figure 7:
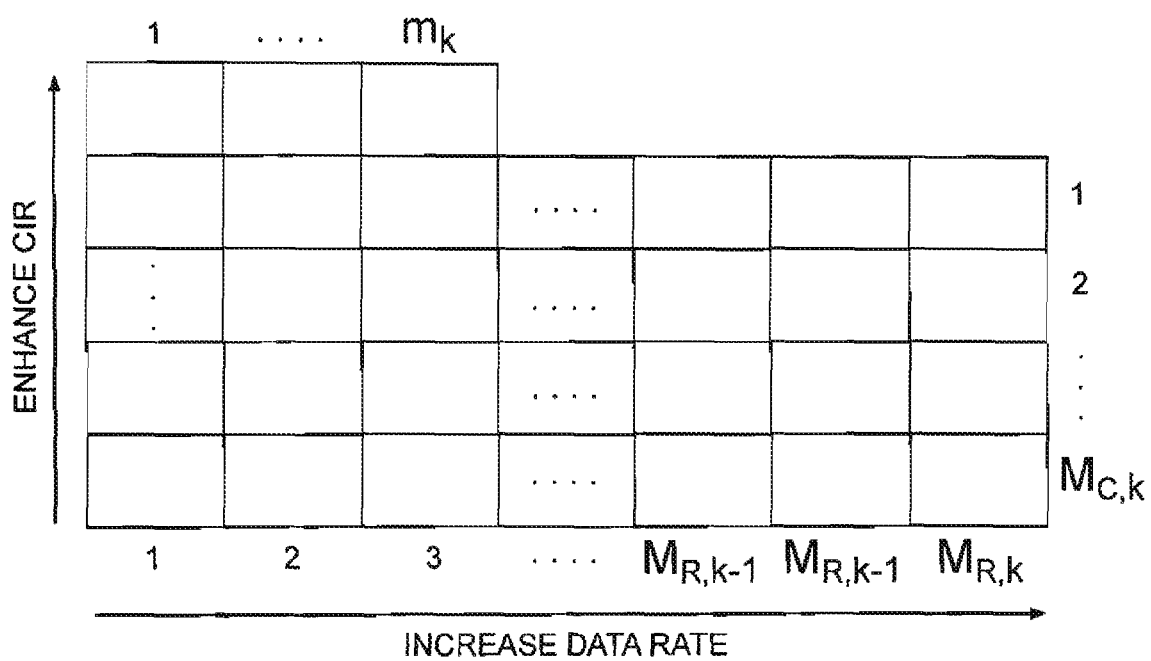
FIG. 7 illustrates assignment of OFDM tones or carriers when transmission repetition is employed.

Further details are now provided with respect to one embodiment of the present invention. As stated above, the remaining users to be scheduled are prioritized based on their respective CIRs over the tones and blocks within the TTI. Assuming there are n available tones associated with an estimated CIR, the remaining users are sorted in ascending order in terms of their reported CIR, which is represented by $\Gamma_{n,k}$, n=1, 2, ... N for the $k^{th}$ user. Further assume that the maximum number of available tones for each TTI would be equal to the number of OFDM tones $N_f$ multiplied by the number of time blocks $N_B$. During poor channel conditions, certain voice packets or real-time packets may need to be sent repeatedly, or multiple times within the TTI. As such, if there are $N_{u,k}$ tones assigned for each user, there are only $N_{R,k}$ tones used for each original voice packet, and the remaining tones are used for repetition to enhance robustness of the transmission. The tones used for repetition are represented by $M_{C,k}$. Thus, for the $k^{th}$ user, the relationship between $n_{u,k}$ and $n_{R,k}$ is $n_{u,k}=n_{R,k}*M_{C,k}+m_k$, where $m_k$ represents supplemental tones used for repetition. This relationship is illustrated in FIG. 7. As depicted, as the number of tones used for voice transmission increases, the data rate will increase. Further, as the number of tones used for repetition ($M_{R,k}$) increases, the robustness of the transmission is increased and will effectively enhance the CIR for a given user.

During the scheduling process, the voice payload transmitted in each frame may be kept relatively constant with a target rate of $R_{TARGET}$. Further, the minimum payload for each TTI transmission may be set to $R_{MIN}$. As such, the scheduler may prevent the transmission of a packet whose payload size is less than the minimum target rate $R_n$. Further, the maximum number of tones may be assigned to a given user $N_{MAX}$, and may be limited when the reported CIR for the tones for a given user is extremely low and transmission repetition would be excessively high.

In order to optimize tone assignment for the kth user, the present invention attempts to minimize the number of tones used by a given user while keeping the payload slightly larger than or equal to the predetermined payload needed for voice transmission in each frame. Thus, the optimization problem for tone assignment has the following form:

$$\min_{M_{R,k}} N_{U,k} \quad \text{Eq. 1}$$

$$\text{subject to } \Gamma l(N_{U,k}, M_{R,k}) = \frac{1}{M_{R,k}} * \sum_{n=1}^{N_{U,k}} \Gamma_{n,k}$$

$$f(\bar{\Gamma}k) = R_k$$

$$M_{R,k} * R \geq R_{MIN}$$

$$\begin{cases} M_{R,k} * R > R_{TARGET} & \text{if } N_{U,k} < N_{MAX} \\ M_{R,k} * R \leq R_{TARGET} & \text{if } N_{U,k} = N_{MAX} \end{cases}$$

$$\text{for } N_{U,k} = 1, 2, \ldots, N \text{ and } M_{R,k} = 1, 2, \ldots, N_{U,k}$$

where $f(x)$ is a mapping function of a data rate, which may be equivalent to or at least correspond to the payload transmitted in each TTI in light of various channel conditions.

Figure 8:
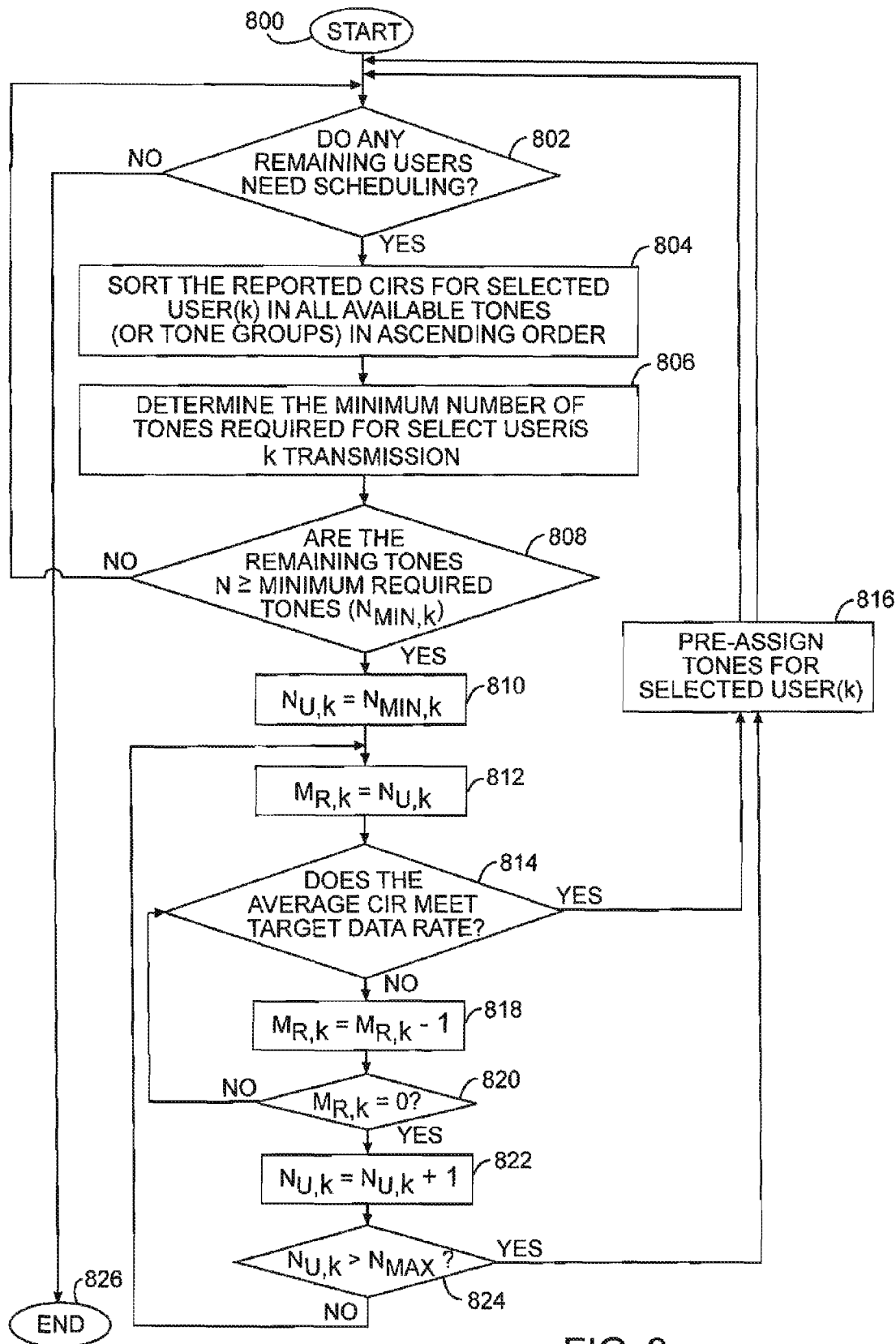
FIG. 8 is a flow diagram illustrating tone assignment according to one aspect of the present invention.

The optimization problem depicted in Equation 1 is a non-linear formula that may be simplified using the mapping function from a link level curve, which is obtained by the relationship between block error rates and the signal-to-noise ratios for different coding rates and modulation techniques. From Equation 1, the number of tones used for original (non-repetition) traffic can be taken as large as possible in an effort to minimize the total number of tones used by a particular user $N_{U,k}$. Assume that N is the number of remaining tones after assigning a certain number of active users. Further assume that $N_{MIN,k}$ is the minimum number of tones required for user k's transmission due to the minimum CIR limitation, defined as $N_{M,k}$ is equal to the CIR threshold for the worst link level curve, divided by maximum reported CIR over all tones or groups of tones for user k. With this information, tone assignment for the $k^{th}$ user may be provided according to the tone assignment process illustrated in FIG. 8.

The process begins (step 800) by determining whether any remaining users need scheduling (step 802). Assuming that there are remaining users that require scheduling, the reported CIRs associated with the selected user (k) in all available tones or tone groups are sorted in ascending order (step 804). Next, the minimum number of tones required for the selected user's transmission is determined (step 806). If the number of remaining unassigned tones (N) is greater than or equal to the minimum number of tones required for transmission ($N_{MIN,k}$) (step 808), the process continues wherein the total number of tones used for transmission for user k ($N_{U,k}$) is set equal to the minimum number of tones required for transmission ($N_{MIN,k}$) in an effort to minimize the number of tones used for transmitting voice for user k (step 810). Next, the number of tones transmitting original data (non-repetition data) ($M_{R,k}$) is set equal to the total number of tones used for transmission by user k ($N_{U,k}$) (step 812). At this point, $N_{R,k}$ and $N_{U,k}$ equal $N_{M,k}$, which is the minimum number of tones required for transmission, $N_{M,k}$ may be a fixed number for all users, or for the selected user k.

Next, the process determines whether the average CIR (or other CIR measurement) meets the target data rate for transmission (step 814). If the average CIR meets the target data rate, the minimum number of tones required for transmission ($N_{M,k}$) is sufficient for transmission, and the process ends, wherein the total number of tones used for transmission for user k ($N_{U,k}$) having the best CIR are pre-assigned to user k (step 816) and the process repeats for the next user.

If the average CIR does not meet the target data rate required for transmission (step 814), this indicates that the absolute minimum number of tones required for transmission to meet data rates ($N_{M,k}$) is not sufficient for transmission in light of channel conditions. In one embodiment, when the average CIR does not meet the target data rate, the number of tones transmitting original data (non-repetition data) is decreased in an effort to allow the average CIR for the tones used for transmission to meet the target data rate. Thus, the number of tones used for transmitting original data is decremented until the average CIR meets the target data rate (steps 818 and 820). If the number of tones for transmitting original data is decremented to zero and the average CIR is still not met given the number of tones used for transmission for the user k ($N_{U,k}$), the number of tones used for transmission for user k ($N_{U,k}$) is incremented (step 822). Assuming the number of tones used for transmission for user k does not exceed the maximum number of tones allowed for transmission ($N_{MAX}$) (step 824), the number of carrier tones transmitting original data ($M_{R,k}$) is set equal to the incremented number of tones used for transmission for user k ($N_{U,k}$) (step 812).

At this point, there is another check to determine whether the average CIR meets the target data rate for the new number of tones used for transmission for user k (step 814). If the average CIR still does not meet the target data rate, the process repeats by decrementing the number of tones used for transmitting original data ($M_{R,k}$) until $M_{R,k}=0$. Then, the total number of tones used for transmission for user k ($N_{U,k}$) is incremented as described above. This process continues until the average CIR in light of the number of tones used for transmission for user k ($N_{U,k}$) is sufficient to meet the target data rate. Once the target data rate can be met, the tones or groups of tones having the best CIRs are pre-assigned to user k (step 816). In particular, the best $N_{U,k}$ tones (the number of tones used for transmission for user k) are pre-assigned to user k. Once the tones are pre-assigned to all users in the process ends (step 826). Based on the above, the best available tones for user k have been pre-assigned based on the pertinent channel information in a manner minimizing the number of tones pre-assigned to user k while maintaining a desired data rate.

Figure 9:
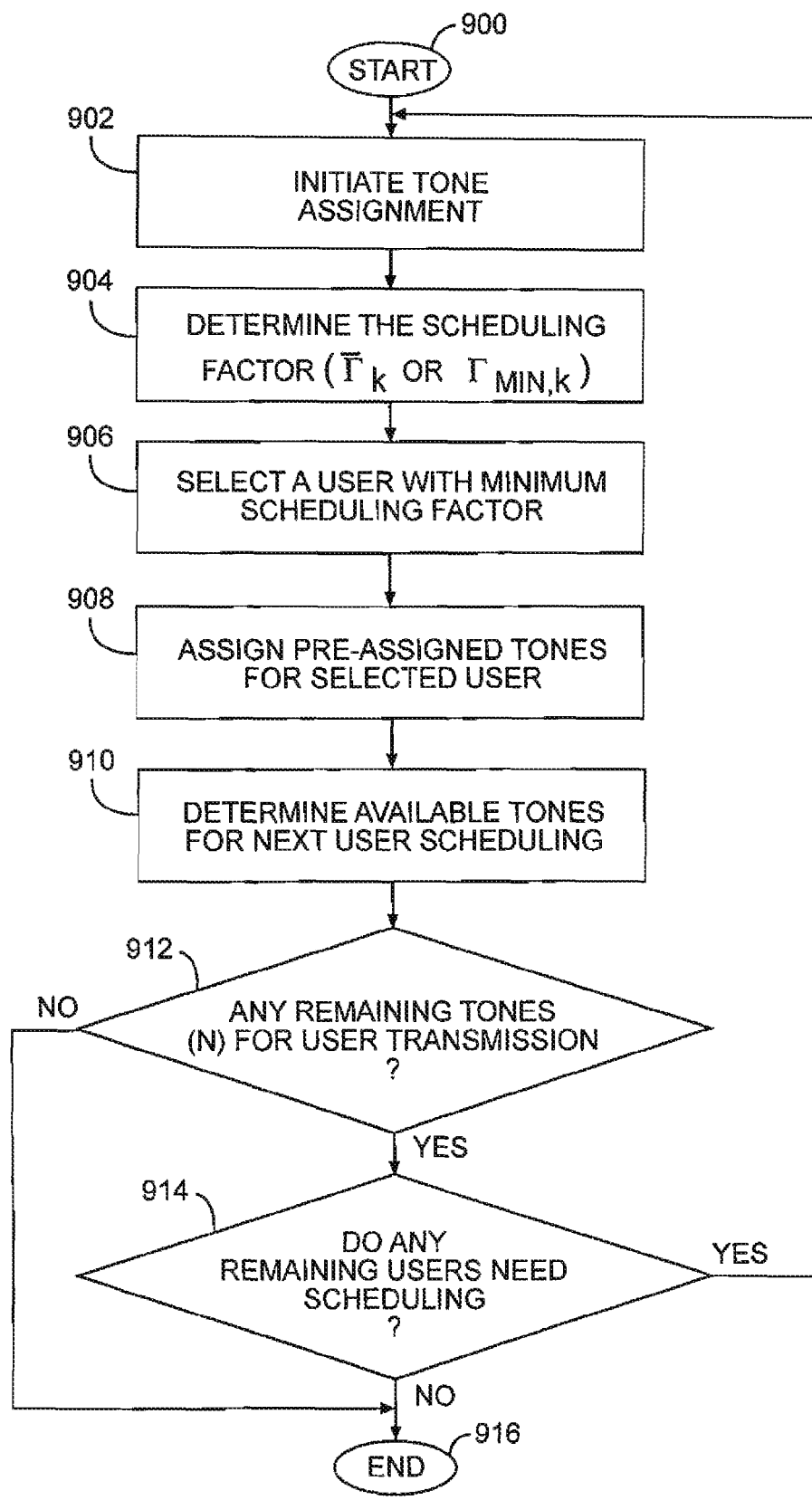
FIG. 9 is a flow diagram illustrating user scheduling according to one embodiment of the present invention.

Turning now to FIG. 9, an exemplary process for user selection once all the active users have been pre-assigned tones is provided. The process begins (step 900) when tone assignment is initiated after each active user has been pre-assigned tones for a given TTI (step 902). A scheduling factor is determined for each of the active users (step 904). The scheduling factor may take many forms, such as a minimum reported CIR ($\Gamma_{MIN,k}$) or an average CIR ($\bar{\Gamma}_k$). Next, the user with the minimum scheduling factor is selected (step 906). The minimum scheduling factor represents the user with the worst channel conditions, and most likely with the largest number of tones used for transmission ($N_{U,k}$). Next, the previously pre-assigned tones for the selected user are assigned to the selected user (step 908). These permanently assigned tones will no longer be available for assigning to the remaining users for the current TTI. Thus, the available tones for the next user's scheduling are then determined (step 910). Next, the process determines whether there are any remaining tones available for user transmission (step 912). If there are remaining tones, the process determines whether there are any remaining users requiring scheduling (step 914). If there are remaining tones for transmission and remaining users requiring scheduling, the process will repeat for the remaining users. If there are not any remaining tones for transmission (N) or no other users need scheduling, the process ends for the current TTI (step 916).

Figure 10:
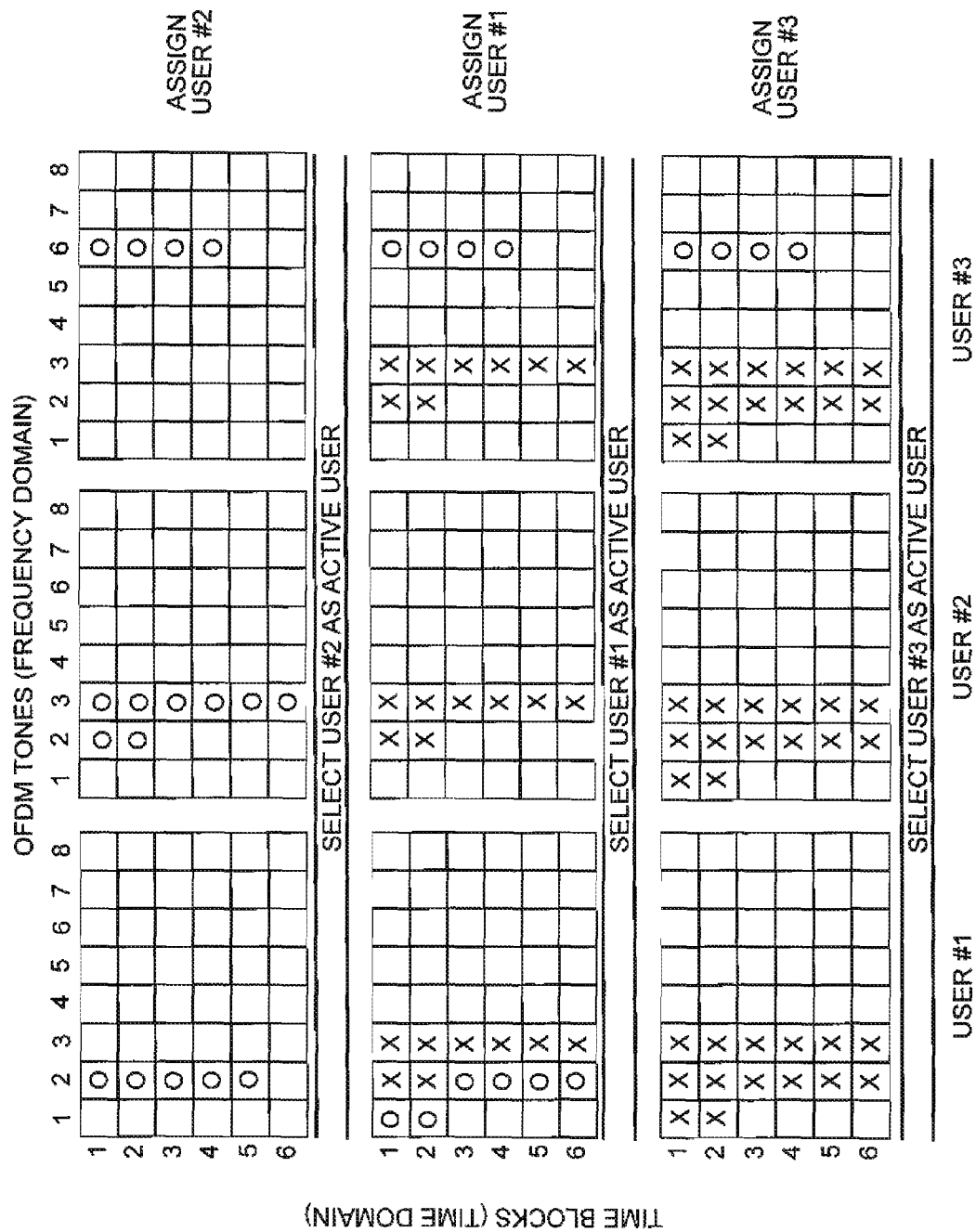
FIG. 10 is a simplified example of scheduling according to one embodiment of the present invention.

With reference to FIG. 10, an example of the above process is illustrated. From the above, the present invention pre-assigns an optimum number of tones for each remaining user based on channel conditions to achieve a desired data rate over a given TTI. Different users may be pre-assigned different or the same tones, as well as different numbers of tones, depending on channel conditions. The example provided in FIG. 10 assumes that there are three active users, eight OFDM tones for each symbol, and six blocks for each TTI. An 'O' designates a tone pre-assignment, whereas an 'X' indicates a permanently assigned tone. The procedure for scheduling the three active users follows.

When scheduling the first user, all tones for all blocks are available. As such, there are effectively 48 channels for a given TTI. Each channel is referenced as $CH_{f,b}$, wherein f represents a tone index and b represents a block index for the respective channel. Assume that the channel information for each of the users and each of the tones have been determined, such that each channel has a corresponding scheduling factor for each user. Further assume that the pre-assignment process dictates that channels have been pre-assigned for users #1, #2, and #3 as illustrated in the top row. In particular, User #1 has been pre-assigned channel $CH_{2,1}$, $CH_{2,2}$, $CH_{2,3}$, $CH_{2,4}$, and $CH_{2,5}$. User #2 has been pre-assigned channels $CH_{3,1}$, $CH_{3,2}$, $CH_{3,3}$, $CH_{3,4}$, $CH_{3,5}$, $CH_{3,6}$, $CH_{2,1}$, and $CH_{2,2}$. User #3 has been pre-assigned channels $CH_{6,1}$, $CH_{6,2}$, $CH_{6,3}$, and $CH_{6,4}$. Based on the pre-assignment information, the user with the minimum scheduling factor, User #2, is selected as the first active user and the channels initially pre-assigned to User #2 are permanently assigned to User #2 for the given TTI. As such, in the second row of FIG. 10, the channels pre-assigned to User #2 ($CH_{3,1}$, $CH_{3,2}$, $CH_{3,3}$, $CH_{3,4}$, $CH_{3,5}$, $CH_{3,6}$, $CH_{2,1}$, and $CH_{2,2}$) are permanently assigned to User #2 and are not available for User #1 or User #3. As such, these channels are indicated as being permanently assigned with an 'X.'

The scheduling process continues by providing the pre-assignment process for User #1 and User #3 given the remaining channels. Assume that the second round of the pre-assignment process pre-assigns User #1 channels $CH_{2,3}$, $CH_{2,4}$, $CH_{2,5}$, $CH_{2,6}$, $CH_{1,1}$, and $CH_{1,2}$ and pre-assigns User #3 channels $CH_{6,1}$, $CH_{6,2}$, $CH_{6,3}$, and $CH_{6,4}$. Again, the remaining user having the minimum scheduling factor is selected. The remaining user having the minimum scheduling factor is User #1, and thus the pre-assigned channels for User #1 are permanently assigned to User #1 for the given TTI. Thus, channels $CH_{3,1}$, $CH_{3,2}$, $CH_{3,3}$, $CH_{3,4}$, $CH_{3,5}$, $CH_{3,6}$, $CH_{2,1}$, $CH_{2,2}$, $CH_{2,3}$, $CH_{2,4}$, $CH_{2,5}$, $CH_{2,6}$, $CH_{1,1}$, and $CH_{1,2}$ are now permanently assigned to active users User #1 and User #2. User #3 is the only remaining user. The pre-assignment process is again provided for the remaining user, User #3, wherein channels $CH_{6,1}$, $CH_{6,2}$, $CH_{6,3}$, and $CH_{6,4}$ are pre-assigned to User #3, and User #3 becomes the final active user. The pre-assigned channels are then permanently assigned to User #3 for the TTI. At this point, all of the active users have been assigned an optimal number of tones in light of the scheduling criteria.

With reference to FIG. 11, the permanently assigned channels for active users User #1, User #2, and User #3 are highlighted. The channels, or tones, used for transmission are $CH_{3,1}$, $CH_{3,2}$, $CH_{3,3}$, $CH_{3,4}$, $CH_{3,5}$, $CH_{3,6}$, $CH_{2,1}$, $CH_{2,2}$, $CH_{2,3}$, $CH_{2,4}$, $CH_{2,5}$, $CH_{2,6}$, $CH_{1,1}$, $CH_{1,2}$, $CH_{6,1}$, $CH_{6,2}$, $CH_{6,3}$, and $CH_{6,4}$. In the above example, each channel corresponds to an OFDM tone.

Figure 12:
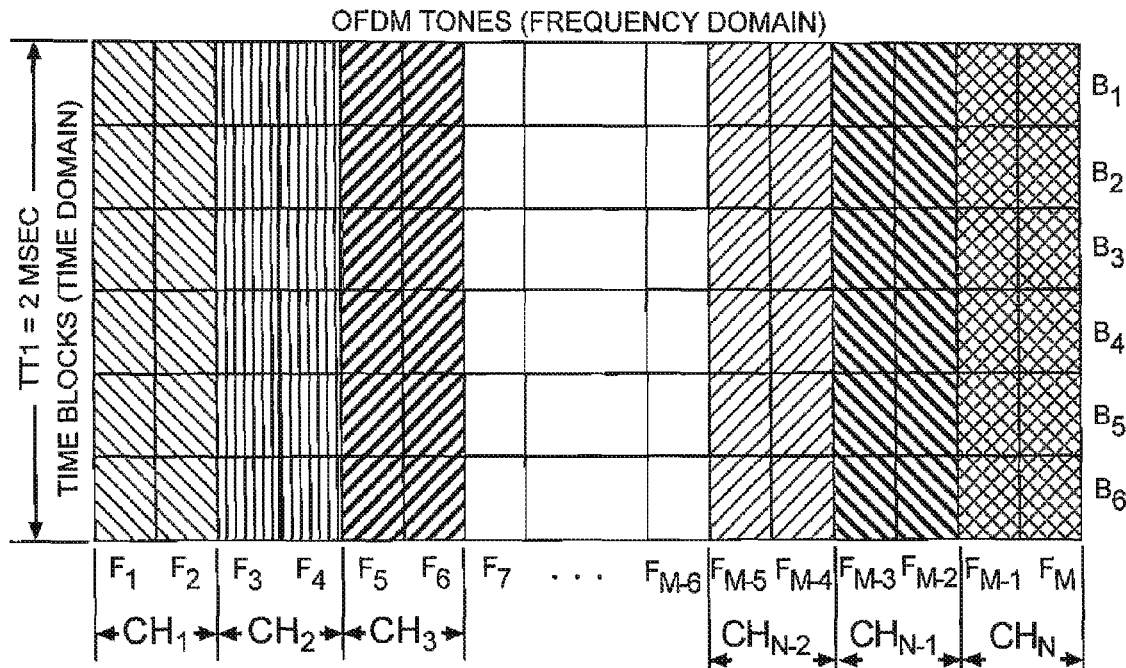
FIG. 12 is a first channel structure for an OFDM system according to one embodiment of the present invention.
Figure 13:
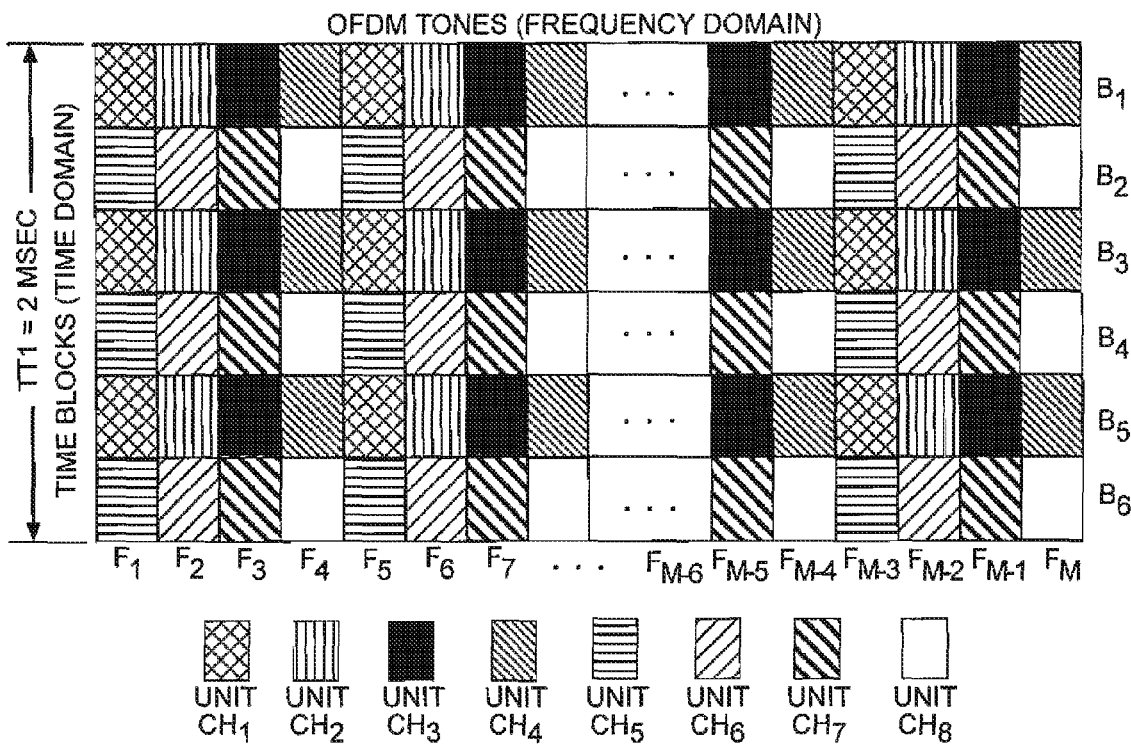
FIG. 13 is a second channel structure for an OFDM system according to one embodiment of the present invention.

During transmission, signaling must be provided between the transmitter and receiver not only to provide channel condition information, but to communicate the channel assignments for a given TTI for each user. If the total number of OFDM tones is large, which is normally the case, the signaling between the transmitter and receiver can become too complex and time consuming. As such, one embodiment of the present invention defines a unit channel, which is assigned to multiple tones over the tone-block continuum of a TTI. Thus, a unit channel consists of multiple OFDM tones and multiple blocks, resulting in a two-dimensional channel assigned for voice or other real-time transmissions. User information may be transmitted on a single unit channel or on multiple unit channels, depending on channel conditions. Assignment and pre-assignment of unit channels may take place as described above. The unit channel may take any structure as long as it can be easily pre-determined between the transmitter and receiver and referenced during signaling. FIGS. 12 and 13 illustrate different unit channel configurations.

In FIG. 12, each unit channel consists of twelve OFDM tones over the frequency and time domain of the TTI. As illustrated, each channel covers two adjacent tones over each of the six time blocks. As such, the total number of unit channels ($CH_N$) is equal to half the total number of tones ($F_M$). In FIG. 13, there are eight unit channels, each formed by many OFDM tones that are substantially uniformly spread over the entire frequency and time domain of the TTI. As such, when one or more unit channels are assigned to a user, transmission will occur over tones spread throughout the time-frequency continuum of the TTI. Those skilled in the art will recognize other techniques for configuring unit channels. For the illustrated examples, the unit channel configuration of FIG. 13 may be appropriate where users may move at a high velocity, which generally causes channel conditions to change quickly. On such a channel, it is generally better to spread the tones assigned to the unit channel over the entire frequency and time domain to achieve greater frequency diversity. In situations with relatively low user velocity, there is a greater emphasis on providing user diversity while keeping the tones assigned to a unit channel relatively clustered together as illustrated in FIG. 12.

To assign one or more unit channels to a particular user, signaling information that is provided in control signals must be sent to each user for each TTI. Given the need to efficiently provide such signaling information to each of the users, there is a need to minimize the amount of signaling required to alert the users of the assigned channels. In one embodiment of the present invention, a multiple unit channel addressing technique is used. This technique assigns different sized unit channels depending on channel conditions. Thus, if a user experiences a low CIR, larger sized unit channels are used. If a user is experiencing a higher CIR, smaller unit channels are used.

Figure 14:
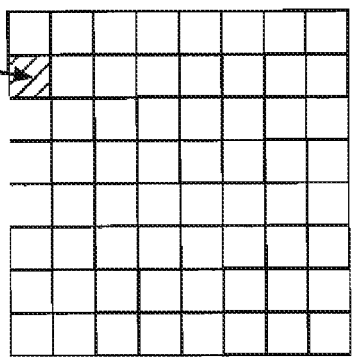
FIG. 14 illustrates multiple channel units to assist in reducing signaling overhead according to one embodiment of the present invention.
Figure 14:
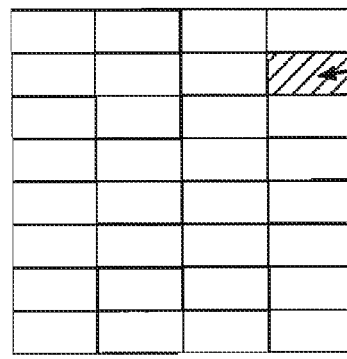
Figure 14:
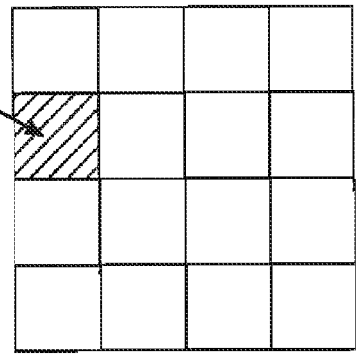
Figure 14:
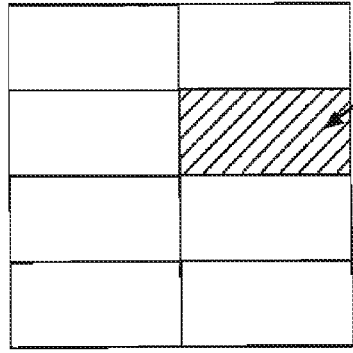

FIG. 14 illustrates four unit channel configurations for allocating 64 channels into different sized unit channels. In the top left configuration, each unit channel corresponds to an actual channel or tone. In the top right, each unit channel corresponds to two actual channels for a total of 32 unit channels. In the bottom left, each unit channel corresponds to four actual channels for a total of 16 unit channels. In the bottom right, each unit channel corresponds to eight actual channels for a total of eight unit channels. For users having a very high CIR, the configuration with 64 unit channels may be used. For users having a high CIR, the configuration with 32 unit channels may be used. For users having a low CIR, the configuration having 16 unit channels may be used. For users with a very low CIR, the configuration having eight unit channels may be used.

For any given TTI, different sized channels may be used to optimize channel allocation and signaling requirements. For example, one large and one small unit channel may be assigned to a given user to minimize signaling overhead as well as efficiently assign the most appropriate number of channels. When unit channels are used for transmission, certain tones within a channel may not be used during certain TTIs, if the number of actually assigned tones does not correlate with an exact number of actual channels and the number of assigned unit channels.

Due to the delay constraints for real-time services, and in particular for voice transmissions, the transmission or retransmission of information must be accomplished within a short timeframe as compared to data transmissions, which are not time-sensitive. In particular, different situations may require an attempt to increase the robustness of retransmissions as well as original transmissions. For example, retransmission robustness may need to be increased as original transmissions or earlier retransmission attempts fail. Further, if there are indications of short-term frame error rates being too high, original transmission robustness may need to be increased by replicating transmissions within one or more TTIs. One embodiment of the present invention takes into account two flexible CIR margins. The first CIR margin depends on the number of retransmissions within a frame, while the other depends on the number of frame errors over a given window of multiple frames. For example, the window may be a 400 ms window, which is capable of including 20 ms frames.

For the first CIR margin depending on the number of retransmissions within a frame, an adaptive CIR margin increases as the number of retransmissions increases. The adaptive margin for a user k can be represented as:

$$\Delta(n_k^{(ReTx)}) = f_{MARGIN}(n_k^{(ReTx)}) \qquad \text{Eq. 2}$$

where $n_k^{(ReTx)}$ is the number of retransmissions for user k, and $f_{MARGIN}$ is the margin function, which could either be a linear or a concave increment function.

For an adaptive CIR margin based on frame errors, the CIR margin value may increase as the number of frame errors increases. The adaptive margin can be represented as:

$$\Delta(n_k^{(FE)}) = \begin{cases} f_{MARGIN}(n_k^{(FE)}) & \text{if } n_k^{(FE)} < \eta \\ 0 & \text{Otherwise} \end{cases} \qquad \text{Eq. 3}$$

where $n_k^{(FE)}$ is the accumulated number of frame errors updated every 400 ms window, and $f_{MARGIN}$ is the margin function, which may be either a linear or a concave increment function. In addition, $\eta$ is the number of frame errors allowed to happen over a window without any impact on voice performance.

Figure 15:
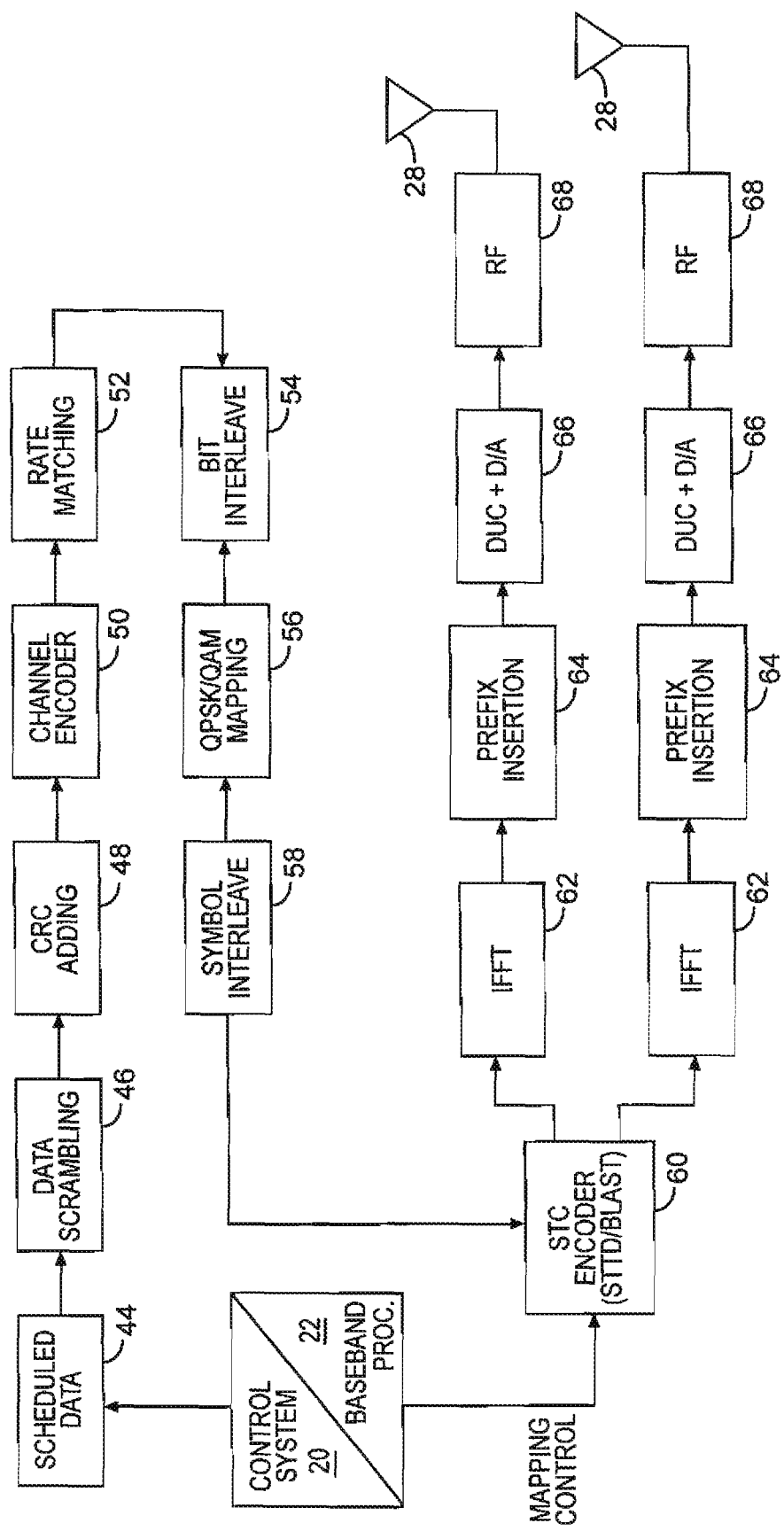
FIG. 15 is a logical breakdown of an OFDM transmitter architecture according to one embodiment of the present invention.

With reference to FIG. 15, a logical OFDM transmission architecture is provided according to one embodiment. Initially, the base station controller 10 will send data to be transmitted to various mobile terminals 16 to the base station 14. The base station 14 may use channel information and other scheduling criteria associated with the mobile terminals 16 to schedule the data for transmission as well as select appropriate coding and modulation for transmitting the scheduled data 44. The channel information and scheduling information may be directly from the mobile terminals 16 or determined at the base station 14 based on information provided by the mobile terminals 16.

The scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. The channel encoder logic 50 uses known Turbo encoding techniques in one embodiment. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is preferably chosen based on a channel quality indicator (CQI) for the particular mobile terminal 16. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (SIC) encoder logic 60, which modifies the symbols in a fashion making the transmitted signals more resistant to interference and more readily decoded at a mobile terminal 16. The STC encoder logic 60 will process the incoming symbols and provide n outputs corresponding to the number of transmit antennas 28 for the base station 14. The control system 20 and/or baseband processor 22 will provide a mapping control signal to control STC encoding. At this point, assume the symbols for the n outputs are representative of the data to be transmitted and capable of being recovered by the mobile terminal 16. See A. F. Naguib, N. Seshadri, and A. R. Calderbank, "Applications of space-time codes and interference suppression for high capacity and high data rate wireless systems," Thirty-Second Asilomar Conference on Signals, Systems & Computers, Volume 2, pp. 1803-1810, 1998, which is incorporated herein by reference in its entirety.

For the present example, assume the base station 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by like insertion logic 64. Each of the resultant signals is up-converted in the digital domain to an intermediate frequency and converted to an analog signal via the corresponding digital up-conversion (DUG) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended mobile terminal 16 are scattered among the sub-carriers or tones. The mobile terminal 16, which is discussed in detail below, may use the pilot signals for channel estimation.

Figure 16:
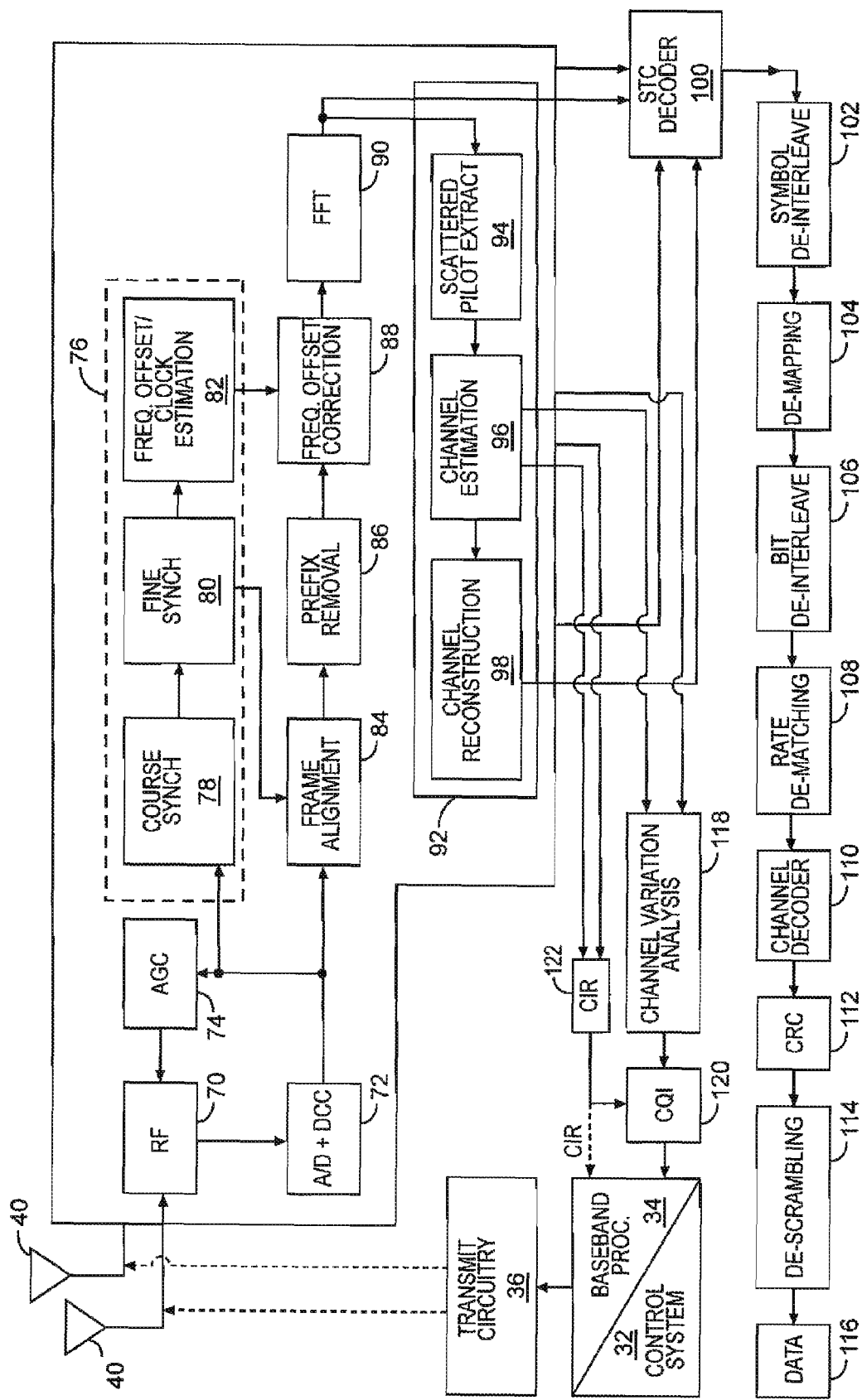
FIG. 16 is a logical breakdown of an OFDM receiver architecture according to one embodiment of the present invention.

Reference is now made to FIG. 16 to illustrate reception of the transmitted signals by a mobile terminal 16. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an autocorrelation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency.

The processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

In parallel to recovering the data 116, a channel quality indicator (CQI) corresponding to channel conditions is determined and transmitted to the base station 14. The CQI may be a function of the carrier-to-interference ratio (CIR), as well as the degree to which the channel response varies across the various sub-carriers in the OFDM frequency band. The channel gain for each sub-carrier in the OFDM frequency band being used to transmit information may be compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

Continuing with FIG. 16, a relative variation measure may be determined by providing the channel response information from the channel estimation function 96 to a channel variation analysis function 118, which will determine the variation and channel response for each of the sub-carriers in the OFDM frequency band, and if standard deviation is used, calculate the standard deviation associated with the frequency response. Once the channel variation analysis is provided, a variation measure is provided to a CQI function 120 or to the baseband processor 34 for transmission back to the base station 14 via the transmit circuitry 36, depending on the configuration of the embodiment. If the CQI is determined at the base station 14, then the mobile terminal 16 will provide information indicative of the CIR as well as the variation analysis to the base station 14, which will calculate a CQI and control scheduling as well as coding and modulation for subsequent transmissions to the mobile terminal 16. If the CQI is generated at the mobile terminal 16 and transmitted to the base station 14, the CQI function 120 will receive a CIR from a CIR function 122 and will use the CIR and the variation measurement to either calculate or look up through a look-up table an appropriate CQI, which is then transmitted to the base station 14 via the transmit circuitry 36.

The CIR function 122 will preferably receive channel response information from the channel estimation function 96 and determine the CIR based on the relative strengths of the desired carrier in light of other interferers in traditional fashion. When pilot symbols are passed through the channel estimation function 96, the pilot symbols are filtered in a manner exploiting the known pilot symbols to remove noise and interference. The output of the channel estimation function 96 is intended to be a noiseless replica of the pilot symbol. With this replica, the carrier power may be determined, as well as subtracted from the received pilot symbol to yield a noise plus interference signal. This resulting signal is computed to provide an interference power, which is compared to the carrier power to determine the CIR. One example of determining a CIR is provided in co-assigned U.S. patent application Ser. No. 10/038,916 filed Jan. 8, 2002, which is incorporated herein by reference in its entirety. Those skilled in the art will recognize numerous techniques for determining the CIR, and if desired, calculating CQI.

Those skilled in the art will recognize improvements and modifications to the preferred embodiments of the present invention. All such improvements and modifications are considered within the scope of the concepts disclosed herein and the claims that follow.

What is claimed is:

1. A method of scheduling data for transmission during a transmit time interval in a multi-carrier communication environment, the method comprising:
    obtaining channel condition information associated with a plurality of users, comprising obtaining respective channel condition information for each respective user of the plurality of users, wherein the channel condition information comprises a channel quality indicator corresponding to channel conditions;
    selecting tones from a plurality of tones according to the channel condition information, wherein the selected tones are associated with channel conditions deemed most favorable for tone assignment to the plurality of users; and
    iteratively assigning, for each transmit time interval of a succession of transmit time intervals, a different respective tone of the selected tones to each respective user, one respective user after another, in a prioritized order determined by the channel condition information.

2. The method of claim 1, wherein the prioritized order proceeds from a respective user associated with channel conditions deemed least favorable to a respective user associated with channel conditions deemed most favorable.

3. The method of claim 1, wherein iteratively assigning a different respective tone to each respective user comprises minimizing a number of assigned tones while ensuring a target data rate is achieved based on channel conditions associated with each of the assigned tones.

4. The method of claim 1, further comprising:
    determining a number of tones for transmitting original data and a number of tones for transmitting redundant data; and
    increasing the number of the tones for transmitting redundant data for respective users associated with poor channel conditions.

5. The method of claim 1, wherein the data scheduled for transmission comprises real-time data.

6. The method of claim 1, wherein the data scheduled for transmission comprises voice information.

7. The method of claim 1, wherein the multi-carrier communication environment is an orthogonal frequency division multiplexing (OFDM) communication environment and the respective tones are OFDM tones.

8. A system for scheduling data for transmission during a transmit time interval in a multi-carrier communication environment, the system comprising:
    a communication interface;
    a network interface; and
    a control system associated with the communication interface and the network interface, wherein the control system is configured to:
        obtain channel condition information associated with a plurality of users by obtaining respective channel condition information for each respective user of the plurality of users, wherein the channel condition information comprises a channel quality indicator corresponding to channel conditions;
        select tones from a plurality of tones according to the channel condition information, wherein the selected tones are associated with channel conditions deemed most favorable for tone assignment to the plurality of users; and
        iteratively assign, for each transmit time interval of a succession of transmit time intervals, a different respective tone of the selected tones to each respective user, one user after another in a prioritized order determined by the channel condition information.

9. The system of claim 8, wherein the prioritized order proceeds from a respective user associated with channel conditions deemed least favorable to a respective user associated with channel conditions deemed most favorable.

10. The system of claim 8, wherein the control system is further configured to iteratively assign a different respective tones to each respective user in a manner that minimizes a number of assigned tones while ensuring a target data rate is achieved based on channel conditions associated with each of the assigned tones.

11. The system of claim 8, wherein the control system is further configured to:
    determine a number of tones for transmitting original data and a number of tones for transmitting redundant data; and
    increase the number of the tones for transmitting the redundant data for respective users associated with poor channel conditions.

12. The system of claim 8, wherein the data scheduled for transmission comprises real-time data.

13. The system of claim 8, wherein the data scheduled for transmission comprises voice information.

14. The system of claim 8, wherein the multi-carrier communication environment is an orthogonal frequency division multiplexing (OFDM) communication environment and the respective tones are OFDM tones.

* * * * *